United States Patent [19]

Uramoto

[11] Patent Number: 5,844,798

[45] Date of Patent: Dec. 1, 1998

[54] METHOD AND APPARATUS FOR MACHINE TRANSLATION

[75] Inventor: Naohiko Uramoto, Yokohama, Japan

[73] Assignee: International Business Machines Corporation, Armonk, N.Y.

[21] Appl. No.: 203,084

[22] Filed: Feb. 28, 1994

[30] Foreign Application Priority Data

Apr. 28, 1993 [JP] Japan .................................. 5-102973

[51] Int. Cl.$^6$ .................................................. G06F 17/27
[52] U.S. Cl. .............................. 364/419.02; 364/419.08
[58] Field of Search ............................ 364/419.02, 200, 364/300, 419.08; 395/144–146

[56] References Cited

U.S. PATENT DOCUMENTS

| | | | |
|---|---|---|---|
| 4,661,924 | 4/1987 | Okamoto et al. | 364/900 |
| 4,868,750 | 9/1989 | Kucera et al. | 364/419 |
| 4,916,614 | 4/1990 | Kaji et al. | 364/419.02 |
| 4,942,526 | 7/1990 | Okajima et al. | 364/419 |
| 4,958,285 | 9/1990 | Tominaga | 364/419 |
| 5,056,021 | 10/1991 | Ausbom | 364/419 |
| 5,132,901 | 7/1992 | Yokogawa | 364/419 |
| 5,181,163 | 1/1993 | Nakajima et al. | 364/419 |
| 5,289,375 | 2/1994 | Fukumochi et al. | 364/419.02 |
| 5,353,221 | 10/1994 | Kutsumi et al. | 364/419.05 |

FOREIGN PATENT DOCUMENTS

| | | |
|---|---|---|
| 0266001 | 5/1987 | European Pat. Off. . |
| 0403660 | 2/1989 | European Pat. Off. . |
| 0409425 | 9/1990 | European Pat. Off. . |
| 0467527 | 10/1991 | European Pat. Off. . |
| 62219165 | 9/1987 | Japan . |
| 38082 | 1/1990 | Japan . |
| 2308370 | 12/1990 | Japan . |
| 3282677 | 12/1991 | Japan . |

OTHER PUBLICATIONS

Pazienza, M.T., Velardi, P., "Using a Semantic Knowledge Base to Support a Natural Language Interface to a Text Database", Entity–Relationship Approach: A Bridge to the User, Proceedings of the Seventh international Conference on Entity–Relationship Approach Rome, Italy, Nov. 16–18, 1988, pp. 456–472.

E. Black, "An experiment in computational discrimination of English word senses", IBM Journal of Research and Development, Mar., 1988, No. 2, Armonk, N.Y., pp. 185–193.

Primary Examiner—Donald E. McElheny, Jr.
Assistant Examiner—Frantzy Poinvil
Attorney, Agent, or Firm—Louis J. Percello

[57] ABSTRACT

A method and apparatus settles the ambiguity of the meaning of a word having a plurality of meanings in a first language to make source sentences in the first language correspond in the most appropriate way to translated sentences in a second language. Source sentences in the first language to be translated are entered to an input unit. Through the input unit source sentences are entered to a polysemous word settlement unit via an entered sentences analyzing unit. A characteristics table generation part stores a characteristics table in which each meaning is preliminarily associated with each characteristic with respect to polysemous words. A characteristics record generation part generates a characteristics record to compare the characteristics table and the characteristics record, thereby selecting and outputting the meaning of the polysemous word based on the characteristics in the source sentences. Each word whose ambiguity has been settled at the polysemous word settlement unit is translated at a correlative translation processing unit to be output to an output unit.

4 Claims, 3 Drawing Sheets

METHOD AND APPARATUS FOR MACHINE TRANSLATION

FIELD OF THE INVENTION

The present invention relates to a method for machine translation and a machine translation apparatus and more particularly to a method for machine translation and a machine translation apparatus wherein machines such as computers are used to translate source sentences in a first language to be translated into translated sentences in a second language.

BACKGROUND OF THE INVENTION

A machine translation apparatus is conventionally known in which a computer carries out analysis, such as morphological analysis, of the structure of source sentences expressed in a first language so as to divide the source sentences into words so that each sentence in the first language is associated with a counterpart in the second language between two different languages (see Japanese Published Unexamined Patent Applications PUPA 2-308370 and PUPA 3-8082 and the like).

This machine translation apparatus performs structural analysis, such as correlative analysis, with respect to source sentences in a first language to be translated. Temporary correlation is attached where a portion of the source sentence whose meaning is ambiguous, so that the portion is translated into the second language by making use of the word order in the source sentence. With respect to ambiguous portion, information in the other portions is utilized so as to settle the ambiguity thereof so as to be translated into the target language.

However it is very difficult to associate source sentences with the translation sentences on a word level when the source sentences contain words having a plurality of meanings (hereinafter referred to as polysemous words) that make the whole sentence ambiguous. Since it is necessary to perform case-by-case analysis of the usage of each word through detailed rules determined by sufficient analysis, such as syntactic analysis, it so happens that an indefinite number of translations can be associated with the polysemous word in source sentences and one meaning cannot be selected.

Accordingly there is known a method for machine translation wherein a verb conversion table is formed as a means for determining the meaning of polysemous words for the process of putting a translation word in a second language to a polysemous verb in a first language, the verb conversion table describing translation and usage for each polysemous verb so that the table can be referred to so as to translate such a verb into a suitable meaning (Japanese Published Unexamined Patent Application PUPA 62-219165).

However in the method for machine translation using a verb conversion table which describes only verbs, information is applied to source sentences uniformly only with respect to verbs. Thus it is impossible to select the most suitable meaning for all the polysemous words contained in the analyzed sentences except for verbs. In addition, it is impossible to handle various semantic information and grammatical information dynamically in determining the meaning of each word.

In addition, there a method is also known for machine translation wherein polysemous words are ordered into a database comprising sentence cases containing situations and attributes, the database being utilized to set a suitable relation between words and the meanings thereof (Japanese Published Unexamined Patent Application PUPA 3-282677).

However, in a method for specifying the meaning of words from case bases in which a plurality of meanings are generalized, the quantity of calculation required for determining the meaning of words increases.

OBJECTS OF THE INVENTION

An object of the present invention is to settle the ambiguity of the meaning of a word having a plurality of meanings in a first language so as to make source sentences in the first language correspond in the most appropriate way to the translated sentences in the second language.

Another object of the present invention is to provide a method for machine translation and a machine translation apparatus wherein source sentences are translated into translation sentences with high accuracy by settling the ambiguity in the meaning of words having plural meanings in a first language so that source sentences in a first language can be most suitably associated with the translation in a second language.

SUMMARY OF THE INVENTION

To attain the above object the present invention provides a method for machine translation wherein structures of source sentences in a first language which contains polysemous words having a plurality of meanings are analyzed so as to obtain semantic information and grammatical information, said semantic information and grammatical information being utilized to translate the source sentences into target sentences in a second language; the method comprising the steps of preliminarily obtaining the relation of sufficient characteristics to the meanings corresponding to said sufficient characteristics, said sufficient characteristics is information which is at least one of either the semantic information or grammatical information corresponding to a single meaning of the plural meanings of a polysemous word from a plurality of sentences, each of which contains polysemous words and is construed so that one of said polysemous words is expressed in an unambiguous manner; determining whether at least one of the semantic information and the grammatical information of the analyzed sentence matches one of said sufficient characteristics; and selecting the meaning of the polysemous words associated with the matched sufficient characteristics.

The invention provides a method for machine translation wherein structures of source sentences in a first language which contain polysemous words having a plurality of meanings are analyzed to obtain semantic information and grammatical information, said semantic information and grammatical information being utilized to translate the source sentences into target sentences in a second language; said method comprising the steps of: preliminarily obtaining the relation of sufficient characteristics to the meanings corresponding to said sufficient characteristics and the relation of required characteristics to the meaning corresponding to said required characteristics, said sufficient characteristics being information which is at least one of either the semantic information or grammatical information corresponding to a single meaning of the plural meanings of a polysemous word from a plurality of sentences, each of which contains polysemous words and is construed so that one of said polysemous words is expressed in an unambiguous manner, said required information being information which is at least one of either the semantic information or grammatical information corresponding to all the sentences with respect to one meaning of the polysemous word; determining whether at least one of either the semantic information or the grammatical information of the analyzed sentence matches one of either said sufficient characteristics or said required characteristics; and selecting the meaning of polysemous words associated with the matched sufficient characteristics or matched required characteristics.

The invention also provides a method for machine translation wherein structures of source sentences in a first language containing polysemous words having a plurality of meanings are analyzed to obtain semantic information and grammatical information, said semantic information and grammatical information being utilized to translate the source sentences into target sentences in a second language; said method comprising the steps of: preliminarily obtaining the relation of sufficient characteristics to the meanings corresponding to said sufficient characteristics, the relation of required characteristics to the meaning corresponding to said required characteristics, and the relation of dependent characteristics to the meaning corresponding to said dependent characteristics, said sufficient characteristics being information which is at least one of either the semantic information or grammatical information corresponding to a single meaning of the plural meanings of a polysemous word from a plurality of sentences, each of which contains polysemous words, and is construed so that one of said polysemous words is expressed in an unambiguous manner, said required information being information which is at least one of either the semantic information or grammatical information corresponding to all the sentences with respect to one meaning of the polysemous word, said dependent characteristics being information which is at least one of either the semantic information or grammatical information corresponding to two or more meanings of said polysemous word; determining whether at least one of either the semantic information or the grammatical information of the analyzed sentence matches one of said sufficient characteristics and said required characteristics; calculating a similarity between one of either the semantic information or the grammatical information and said sufficient characteristics and required characteristics based on said sentences included in the scope of the meaning corresponding to said dependent characteristics when at least one of either the semantic information or grammatical information does not match said sufficient and required characteristics; and selecting the meaning of said polysemous word based on the result of the calculation.

In addition, the invention provides a machine translation apparatus in which structures of source sentences in a first language containing polysemous words having a plurality of meanings are analyzed to obtain semantic information and grammatical information, said semantic information and grammatical information being utilized to translate the source sentences into target sentences in a second language; said apparatus comprising: a characteristic table expressing the relation between sufficient characteristics to the meaning corresponding to said sufficient characteristics, said sufficient characteristics being information which is at least one of either the semantic information or grammatical information corresponding to a single meaning of the plurality of meanings of a polysemous word from a plurality of sentences, each of which contains one of the polysemous words, and is construed so that one of said polysemous words is expressed in an unambiguous manner; a determination means for determining whether at least one of either said semantic information or grammatical information in said analyzed sentences matches said sufficient characteristics by referring to said characteristics table; and a selection means for selecting the meaning of said polysemous word corresponding to said matched sufficient characteristics.

Further, the invention provides a machine translation apparatus in which structures of source sentences in a first language containing polysemous words having a plurality of meanings are analyzed so as to obtain semantic information and grammatical information, said semantic information and grammatical information being utilized to translate the source sentences into target sentences in a second language; said apparatus comprising: a characteristics table expressing the relation of sufficient characteristics to the meanings corresponding to said sufficient characteristics and the relation of required characteristics to the meaning corresponding to said required characteristics, said sufficient characteristics being information which is at least one of either the semantic information or grammatical information corresponding to a single meaning of the plurality of meanings of a polysemous word from a plurality of sentences, each of which contains one of the polysemous words, and is construed so that said one of polysemous words is expressed in an unambiguous manner, said required information being information which is at least one of either the semantic information or grammatical information corresponding to all the sentences with respect to one meaning of the polysemous word; a determination means for determining whether at least one of either said semantic information or grammatical information in said analyzed sentences matches said sufficient characteristics and required characteristics by referring to said characteristics table; and a selection means for selecting the meaning of said polysemous word corresponding to said matched sufficient characteristics.

The invention in addition provides a machine translation apparatus in which structures of source sentences in a first language containing polysemous words having a plurality of meanings are analyzed so as to obtain semantic information and grammatical information, said semantic information and grammatical information being utilized to translate the source sentences into target sentences in a second language; said apparatus comprising: a characteristics table expressing the relation of sufficient characteristics to the meanings corresponding to said sufficient characteristics, the relation of required characteristics to the meaning corresponding to said required characteristics, and the relation of dependent characteristics to the meaning corresponding to said dependent characteristics, said sufficient characteristics being information which is at least one of either the semantic information or grammatical information corresponding to a single meaning of the plurality of meanings of a polysemous word from a plurality of sentences, each of which contains one of the polysemous words, and is construed so that said one of polysemous words is expressed in an unambiguous manner, said required information being information which is at least one of either the semantic information or grammatical information corresponding to all the sentences with respect to one meaning of the polysemous word, said dependent characteristics being information which is at least one of semantic information and grammatical information corresponding to two or more meaning of said polysemous word; a determination means for determining whether at least one of either the semantic information or the grammatical information of the analyzed sentence matches one of either said sufficient characteristics or said required characteristics; a calculation means for calculating a similarity between one of either the semantic information or the grammatical information and said sufficient characteristics and required characteristics based on said sentences included in the scope of the meaning corresponding to said dependent characteristics when said determination means determines that at least one of either the semantic information or grammatical information does not match said sufficient and required characteristics; and a selection means for selecting the meaning of said polysemous word based on the result of the calculation.

In a method for machine translation structures of sentences in a first language to be translated containing a polysemous word having a plurality of meanings are analyzed to determine semantic information and grammatical information. The semantic information and grammatical information is used to translate source sentences into sentences in a second language. Polysemous words cannot be directly translated into the second language because ambiguity is produced. Generally polysemous words have distinctive characteristics for each meaning that serve to distinguish their meanings from each other. In other words they contain semantic information indicating that the object is a material or the subject is an opponent as well as grammatical information indicating that the verb is used as a transitive verb or the verb has two objects. These characteristics can be grammatical information or semantic information.

The method for machine translation involves preliminarily obtaining the relation of sufficient characteristics to the meanings corresponding to the sufficient characteristics, the sufficient characteristics being information which is at least one of either the semantic information or grammatical information corresponding to a single meaning of the plurality of meanings of a polysemous word from a plurality of sentences each of which contains polysemous words and is construed so that one of the polysemous words is expressed in an unambiguous manner. The method determines from the obtained information whether one of either the semantic or grammatical information in a first language sentence whose structure has been analyzed matches the sufficient characteristics. When the meaning of a polysemous word corresponding to matched sufficient characteristics is selected, the ambiguity of each meaning in the sentence in the first language is settled and the sentence can be easily translated into the second language.

The method for machine translation can be embodied on a machine translation apparatus by providing a characteristic table expressing the relation between sufficient characteristics to the meaning corresponding to the sufficient characteristics. The sufficient characteristics is information which is at least one of either the semantic information or grammatical information corresponding to a single meaning of the plurality of meanings of a polysemous word from a plurality of sentences. Each of the sentences contains one of the polysemous words, and is construed so that one of polysemous words is expressed in an unambiguous manner. A determination means determines whether at least one of the semantic information and grammatical information in the analyzed sentences matches the sufficient characteristics by referring to the characteristics table. Then a selection means selects the meaning of the polysemous word corresponding to the matched sufficient characteristics. Thus the sufficient characteristics distinguishing the meaning from other meanings is determined in order to select the meaning. Consequently no high load similarity calculation needs to be performed.

In addition, when one meaning in a polysemous word has characteristics common to all the sentences corresponding to the meaning, the sentences to be entered must contain this information in common.

A method for machine translation can also involve preliminarily determining the relation of the sufficient characteristics to the meaning corresponding to the sufficient characteristics and the relation of required characteristics to the meaning corresponding to the required characteristics. The sufficient characteristics is information which is at least one of either the semantic information or grammatical information corresponding only to a single meaning of plural meanings of a polysemous word from a plurality of sentences. Each of the sentences contains one of the polysemous words, and is construed so that one of the polysemous words is expressed in an unambiguous manner. The required characteristics being information which is at least one of either the semantic information or the grammatical information corresponding to all the sentences with respect to a single meaning of a polysemous word. This method further involves determining from the obtained relation whether at least one of either the semantic information or grammatical information in a first language sentences whose structure has been analyzed matches the sufficient characteristics and the required characteristics to select the meaning of a polysemous word corresponding to the matched sufficient characteristics and the matched required characteristics. Thus the meaning is selected by determining the required characteristics that exist without fail with respect to the meaning determined by the sufficient characteristics which the sentences to be translated have. Consequently, no high load similarity calculation needs to be performed and the meaning of a polysemous word can be selected with high accuracy.

This method for machine translation can be embodied in a machine translation apparatus by providing a characteristics table expressing the relation of the sufficient characteristics to the meaning corresponding to the sufficient characteristics and the relation of the required characteristics to the meaning corresponding to the required characteristics. The sufficient characteristics being information which is at least one of the semantic information and the grammatical information corresponding only to a single meaning of the plural meanings of a polysemous word from a plurality of sentences. Each of the sentences contains one of the polysemous words and is construed so that one of said polysemous words is expressed in an unambiguous manner. A determination means determines whether at least one of either the semantic information or the grammatical information of the analyzed sentences matches the sufficient characteristics and the required characteristics. Then a selection means selects the meaning of a polysemous word corresponding to the matched sufficient characteristics.

An alternative method for machine translation involves preliminarily determining the relation of the sufficient characteristics to the meaning of the sufficient characteristics, the relation of the required characteristics to the meaning of the required characteristics and the relation of the dependent characteristics to the meaning of the dependent characteristics. The sufficient characteristics are information which is at least one of either the semantic information or the grammatical information corresponding only to a single meaning of the plural meanings of a polysemous word from a plurality of sentences. Each of the sentences contains polysemous words and is constructed so that one of the polysemous words is expressed in an unambiguous manner. The required characteristics is information which is at least one of either the semantic information or grammatical information corresponding to all the sentences with respect to one meaning of the polysemous word, the dependent characteristics being information which is at least one of either the grammatical information or grammatical information corresponding to two or more meanings of the polysemous words. The method further involves determining from the obtained relation whether at least one of either the semantic information or grammatical information of first language sentences whose syntactic structures have been analyzed matches the sufficient characteristics and required characteristics. The method still further involves calculating a similarity based on sentences included in the scope of the meaning corresponding to the dependent characteristics when at least one of either the semantic information or grammatical information matches the sufficient characteristics and the required characteristics and selecting the meaning of the polysemous word from the result of the calculation. For example, a meaning is selected which has a high similarity. Consequently, the meaning of the polysemous word can be determined when the first language to be translated does not have distinctive features such as sufficient characteristics or required characteristics.

This alternative method for machine translation can be embodied as a machine translation apparatus that determines the relation of sufficient characteristics to the meaning corresponding to the sufficient characteristics and the relation of required characteristics to the meaning corresponding to the required characteristics. The sufficient characteristics being information which is at least one of either the semantic information or grammatical information corresponding to the sufficient characteristics, or being information which is at least one of either the semantic information or the grammatical information corresponding only to a single meaning of the plural meanings of a polysemous word from a plurality of sentences. Each of the sentences contains one of the polysemous words, and is construed so that said one of polysemous words is expressed in an unambiguous manner, the required characteristics being information which is at least one of either the semantic information or grammatical information corresponding to two or more meanings of the polysemous word. The apparatus provides a characteristics table expressing the relation of dependent characteristics to the meaning corresponding to the dependent characteristics, the dependent characteristics being information which is at least one of semantic information and grammatical information corresponding to two or more meanings of the polysemous word. A determination means determines whether at least one of either the semantic information or grammatical information of the analyzed sentences matches the sufficient characteristics and required characteristics by referring to the characteristics table. A calculation means calculates a similarity based on sentences included in the scope of the meaning corresponding to the dependent characteristics when the determination means determines at least one with sufficient characteristics and required characteristics. A selection means selects the meaning of the polysemous word based on the result of calculation.

DESCRIPTION OF SYMBOLS 10 machine translation apparatus
20 polysemous word settlement unit
30 characteristics table generation part

DETAILED DESCRIPTION OF THE INVENTION

Embodiment 1 of the present invention will be detailed herein below by referring to the accompanying drawings. This embodiment has been realized by applying the present invention to a machine translation apparatus wherein English is utilized as a first language to be translated and Japanese is set as a second language into which the first language is to be translated thereby translating source sentences in English into Japanese.

Figure 1:
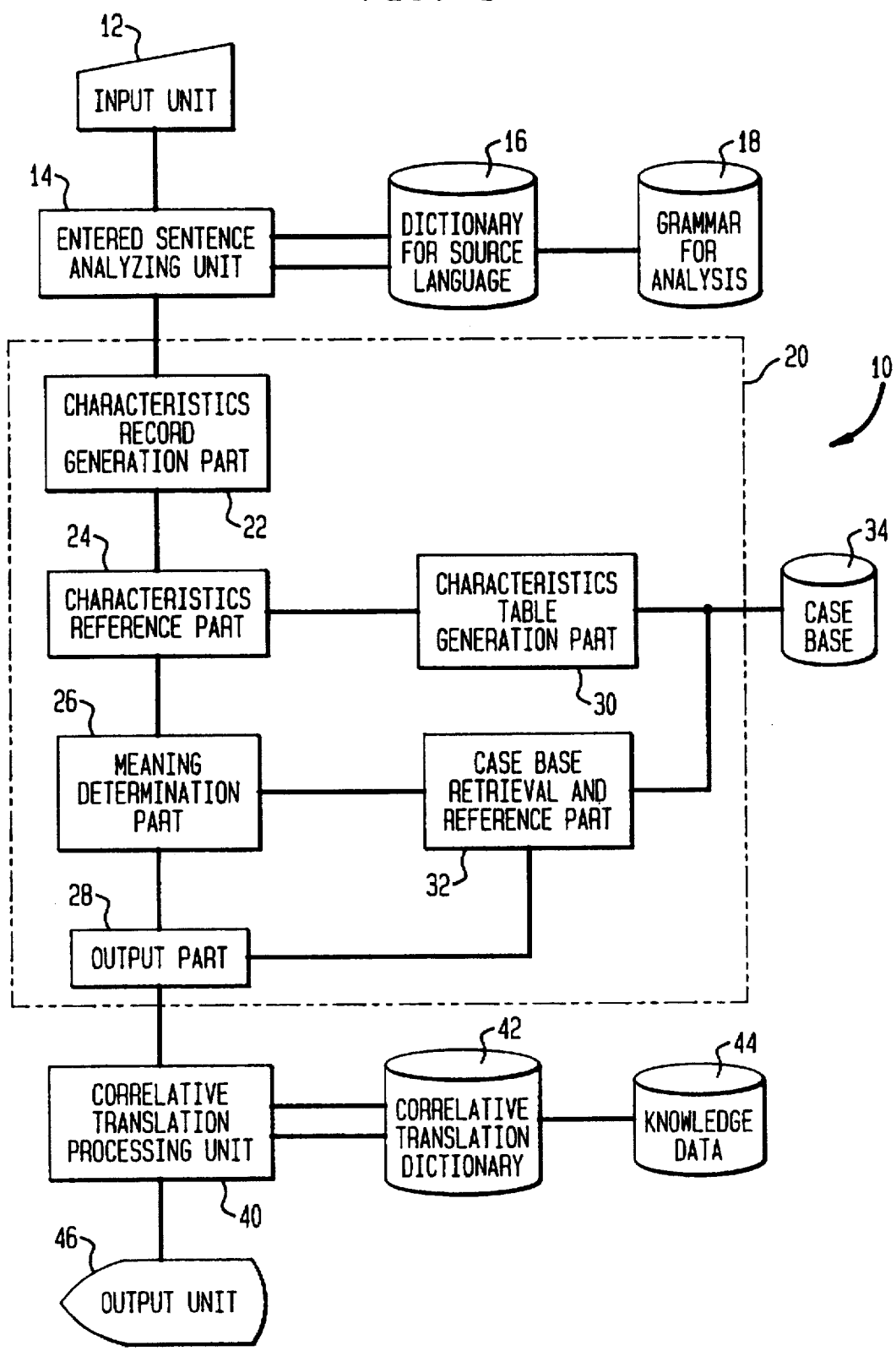
FIG. 1 is a block view showing the general construction of a machine translation of the present invention.

As shown in FIG. 1, Embodiment 1 of a machine translation apparatus 10 comprises an input unit 12 such as user terminals (such as keyboards), an input sentence analyzing unit 14, polysemous word settlement unit 20, a correlative translation processing apparatus 40, and an output unit 46. To the input unit 12 is connected an input sentence analyzing unit 14 to which source sentences from the input unit 12 such as user terminals (such as keyboards) are input. To the input sentence analyzing apparatus 14 are connected original dictionary memory 16 storing a dictionary for an original language and a grammar memory 18 for storing grammar for analysis.

Furthermore, source sentences entered into the above input sentence analyzing apparatus 14 are not limited to verbiage. Source sentences may be symbols expressing language output by a sound recognition unit for recognizing spoken language.

The input sentence analyzing unit 14 is connected to a polysemous word settlement unit 20. Source sentences in the first language, after being subjected to syntactic analysis with the input sentence analyzing unit 14, are entered to a polysemous word settlement unit 20.

The polysemous word settlement unit 20 is a unit for selecting the meaning of a polysemous word which is ambiguous. The unit 20 comprises a characteristics table generating part 22, a characteristics referring part 24, a word meaning determining part 26, an output part 28, and a characteristics table generating part 30 and the case base retrieving and referring part 32. The polysemous word settlement unit 20 provides a case base 34. The case base 34 is connected to the characteristics table generating part 30 and the case base retrieving and referring part 32. The details of the construction of the unit will be explained later. Each word whose ambiguity has been settled in the polysemous word settlement unit 20 is output to the correlative translation unit 40.

This case base 34 stores a plurality of cases 50i (i=1, 2, . . . , n, where n represents the total number of cases) whose ambiguity in the meaning has been settled as shown in the following (source sentences) as a data base in which original English sentences are recorded as case 50i.

|Source sentences|

We took a cup of coffee. . . . (501)

The army took the fort. . . . (502)

Take her another cup of tea. . . . (503)

She took a gift from him. . . . (504)

To the correlative translation unit 40 is connected a correlative translation information memory 44 in which case data like idiomatic expressions as information and knowledge data as the meaning are stored via a correlative translation dictionary 42. In the correlative translation dictionary 42 is stored a translation word in the second language with respect to the first language. Furthermore, correlative information memory 44 may store generative grammar and generative rules in the second language.

Figure 2:
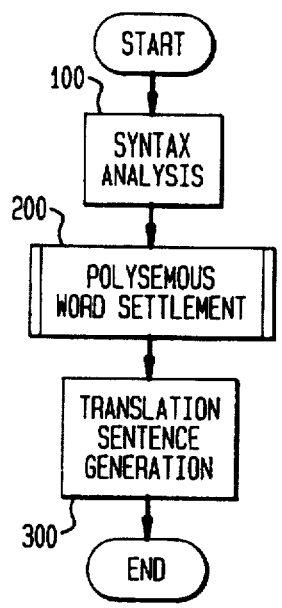
FIG. 2 is a flowchart showing the main routine of the machine translation apparatus according to the present invention.

The operation of the Embodiment of the present invention will be detailed herein below. As shown in FIG. 2, when an operator enters a sentence to be translated with an input unit 12 (like a keyboard), the input unit 12 outputs this sentence to the input sentence analyzing unit 14. The input sentence analyzing unit 14 performs syntactic analysis of entered sentences (at step 100). Upon termination of syntactic analysis, the input sentence analyzing unit 14 outputs entered sentences and the result of syntactic analysis to the polysemous word settlement unit 20. The polysemous word settlement unit 20 selects one meaning of the polysemous word by referring to the characteristics table (detailed herein below) preliminarily stored based on entered sentences and the result of analysis (at step 200). Entered sentences whose meaning is determined to be one meaning are output to the correlative translation processing unit 40. The correlative translation processing unit 40 generates translation sentences by selecting correlative translation of each word in the entered sentences having polysemous words whose ambiguity has been settled (at step 300).

A characteristics table 56k (k=1, 2, . . . n, where n represents the number of polysemous words), which will be used in selecting the meaning of polysemous words, will be explained. The characteristics table generating part 30 of the polysemous word settlement unit 20 effects the routine of the characteristics table generation processing shown in FIG. 3 under the instruction of the operator. The routine may be effected when the power source is entered. In accordance with the present invention, the characteristics table will be stored in the memory of the characteristics table generating part 30, not shown in the drawings, until the content of the case base 34 is converted.

Figure 3:
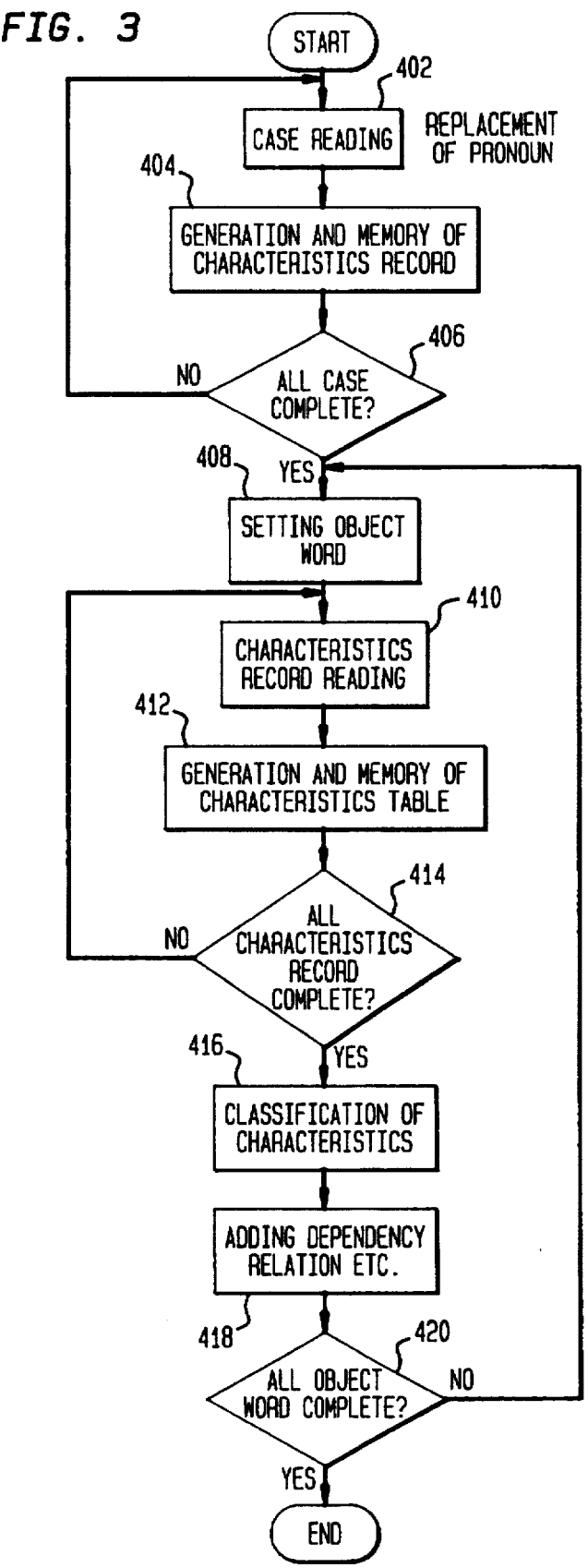
FIG. 3 is a flowchart showing the flow of the routine for generating the characteristics table.

Along with the routine of the characteristics table shown in FIG. 3, the process proceeds to step 402 to read the recorded case 50i from case base 34. Incidentally in reading case 50i, cases in which semantic information and grammatical information appears two or more times in an overlapping manner are extracted so as to improve the certainty of the generated characteristics table (hereinafter referred to as characteristics). In addition, at step 402 with respect to cases that have been read, pronouns such as he, she, etc., in the above source sentences are simultaneously substituted by concept words such as person or the like as Conversion A shown herein below.

| Conversion A |
|---|
| person took a cup of coffee. . . . (501') |
| The army took the fort. . . . (502') |
| Take person another cup of tea. . . . (503') |
| person took a gift from him. . . . (504') |

At the subsequent step 404, characteristics record 54i (1≦i≦n) comprising a plurality of characteristics stored in a characteristics field of one case is generated and stored by matching the characteristics of read cases with the characteristics field 52j (j=1, 2, . . . m, where m represents the number of characteristics that can be included in one case).

In this embodiment, the following five characteristics are used as characteristics of cases stored in each characteristics of characteristics record.

1. words at the position of the subject (subject)
2. words at the position of the object (object)
3. prepositions (preposition)
4. words accompanying prepositions (noun with preposition)
5. sentence patterns (pattern)

Consequently in this embodiment, characteristics records 54i are stored in the order of characteristic fields 521, 522, 523, 524, and 525 like characteristics record format shown herein below.

Characteristics record format

54i = (subject), (object), (preposition),
     521      522      523
(noun with preposition), (pattern)
     524      525

Incidentally the number of the above characteristics is not restricted to 5, and it may be 4 or less or 6 or more. As an example of 6 or more characteristics can be further added any synonyms of words at the position of the subject or a group of words corresponding to the upper and lower concepts thereof, synonyms of words at the position of objects or a group of words corresponding to the upper and lower concepts thereof, words at the position of the second object, synonyms of words at the position of the second object or a group of words corresponding to the upper and lower concepts thereof, and synonyms of prepositions or a group of words corresponding to the upper and lower concept thereof and a group of co-appearance words.

At the subsequent step 406, a determination is made as to whether the generation of characteristics record 54i is completed with respect to all cases 501 to 50n recorded in case base 34. Upon completion of all the characteristics record 54i with respect to all the cases 501 to 50n, the process proceeds to step 408. At step 408, one word is set which becomes an object for generating the characteristics table 56k. The process proceeds to step 410. Herein below will be detailed an example that can be initiated from setting the word "take."

At step 410 one characteristics record 54i including the set word "take" is read to proceed to step 412. At step 412, a characteristics table 561 concerning the word "take" is generated and stored by registering the characteristics of the read characteristics record 54i. In other words, since the word "take" in one case has a single meaning, each characteristics is registered in the characteristics table 561 wherein the meaning of the word take in one case is associated with the above five characteristics. Consequently when the characteristics are registered, the characteristic of the synonymous characteristics record is registered at a portion corresponding to the identical meaning. For example, the word take includes the following 10 meaning S (sense)

Meaning S (sense)
1. occupy
2. grasp
3. make picture
4. choose
5. carry
6. carry person
7. use
8. receive
9. pay
10. drink At step 414 a determination is made as to whether the characteristic with respect to all the cases 50i including the word take recorded in case base 34 is registered in the characteristics table. Upon completion of the registration of the characteristic of all the cases 501 to 50n, the process proceeds to step 416.

An example of the characteristics table generated as shown above with respect to the word "take" is shown in Table 1.

characteristics 62, and words that constitute required characteristics 64 are underlined, so that the above characteristics can be classified. In addition, no symbol is added to the dependent characteristics 66. However, the relation of dependency is shown in Table 1 by adding a subscript in a round bracket. In Table 1 numbers in the bracket correspond to the associated meaning. The subscript (1–9) designates that there is the relationship of dependency between the

TABLE 1

Characteristics Table for the English Verb Take

| sense/feature | 1. subject | 2. object | 3. prep. | 5. noun with prep. | 6. pattern |
|---|---|---|---|---|---|
| 1. occupy | person (all) *enemy *army | *animal *castle | by in | *surprise *battle | <u>SVO</u> |
| 2. grasp | person (all) | *arm *hand | by | | <u>SVO</u> |
| 3. make picture | person (all) | *photograph | at | | <u>SVO</u> |
| 4. choose | | | | | <u>SVO</u> |
| 5. carry | person (all) | *person (6) | to with | *hospital person (8) | <u>SVO</u> |
| 6. carry person | person (all) | *person (5) | of | | *<u>SVOO</u> |
| 7. use vehicle | person (all) | *car *bus | to | *home | <u>SVO</u> |
| 8. receive | person (all) | | from | person (6) | <u>SVO</u> |
| 9. pay | <u>person</u> (all) | *flat | | | <u>SVO</u> |
| 10. drink eat | person (all) | *coffee *medicine *breath | of with | | <u>SVO</u> |

At step 416 each characteristic registered in characteristics table 561 is classified into sufficient characteristic 62, required characteristic 64, and dependent characteristic 66.

The sufficient characteristic 62 means those characteristics, each of which is registered in characteristics table 561, and do not appear at all with other meanings. For example, since the word person appears to other meanings as shown in Table 1, it cannot become a sufficient characteristic 62. The word army which does not appear to other meanings becomes a sufficient characteristic.

In addition, required characteristics 64 means those characteristics, each of which is registered in the characteristics table 561, and are common to all the cases that can be associated with the meaning. For example, when the sentence patterns are referred to with respect to all the cases of the word "take" (Table 1), the word "take" is utilized as a transitive verb. The sentence patterns used as a transitive verb becomes a required characteristic 64.

Besides, dependent characteristics 66 means those characteristics, each of which is registered in the characteristics table 561, and appear simultaneously with other meanings. For example, the word person appears with other meanings of the word "take," it can become a dependent characteristics 66.

Upon completion of the above classification of characteristics, at step 418 the dependency relation and the frequency of appearance are added to the characteristics record classified into each group. In other words, characteristics that are neither sufficient characteristics 62 nor required characteristics 64 have a relation of dependency with other cases added on. The relation of dependency is not determined from the above characteristics table 561 but is determined from the characteristics record of the cases. Consequently the relation of dependency can be considered in characteristics that appear only once as an case.

In the characteristics table 561, shown in the above Table 1, symbol * is added to words that constitute sufficient number 1 and the number 9. The subscript(all) designates the relationship of dependency between all the meanings.

Incidentally, the description is omitted here, the degree designating the frequency is associated with every characteristic. At subsequent step 420, the presence of the polysemous words is determined and the presence of words that become an object that generates the characteristics table is determined. When a polysemous word still exists, the process returns to step 408. By repeating the above processing, a characteristics table 56i with respect to each polysemous word is generated.

On the other hand, when generation of the characteristics table is completed with respect to all the polysemous words, the routine is completed.

Since the characteristics table is generated from the case base 34 storing source sentences the table of which expresses the characteristics corresponding to the extracted meaning with respect to each case of one word. Thus the characteristics in the case can be extracted as the characteristics for differentiating one meaning from the other.

Furthermore, the characteristics table that has been preliminarily prepared may be stored as the above described characteristics table. In addition, the above characteristics table is not restricted to being generated for each word, but correspondence with respect to a plurality of polysemous words may be stored in the characteristics table. One characteristics table may be divided so that polysemous words are associated with different regions.

Figure 4:
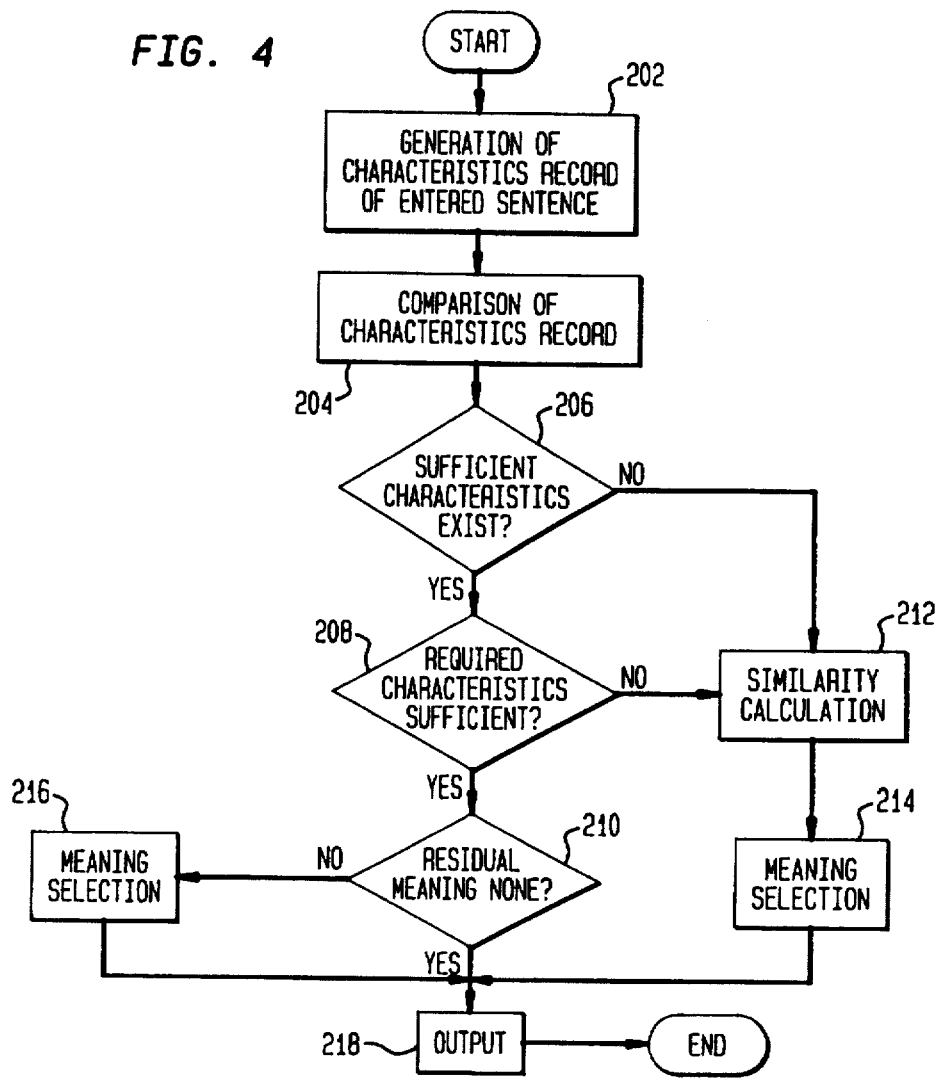
FIG. 4 is a flowchart showing the flow of the routine for processing the settlement of polysemous word.

Subsequently step 200 will be detailed herein below. As shown in FIG. 4, step 200 is a subroutine in which the above generated characteristics table is used to settle polysemous words to select the meaning thereof. In other words, the characteristics are extracted from the entered sentences at step 200. When the characteristics satisfy the sufficient characteristics 62 and the required characteristics 64 of one meaning, the meaning is defined as that of a polysemous word.

Incidentally, to simplify the explanation, a case will be explained in which the following entered sentences 1 are used as an example of sentences to be entered to select the meaning of the polysenious word take that has generated the characteristics table 561.

Entered sentence 1

He took the cab to the station.

When the routine is effected, the process proceeds to step 202 to generate the characteristics record 55 of the sentence entered after the completion of the analysis of sentences in the same manner as the characteristics record generation part 22 generates the above characteristics table. In this case, information that "he" is a noun and the subject is entered to the characteristics record generation part 22 when the entered sentence analyzing unit 14 analyzes the syntax.

55=(person), (cab), (to), (station), (SVO)

At subsequent step 204, the characteristics that match the characteristics record 55 are sought by referring to the above characteristics table 561 with respect to the characteristics record 55 generated at the characteristics referring part 24. The relationship between each of the characteristics of this generated characteristics record 55 and the above characteristics table 561 are shown below in Table 2.

TABLE 2

| Kind of characteristics | Characteristics | Classification of characteristics | Associated meaning |
|---|---|---|---|
| subject | person | dependent characteristics | 1–10 |
| object | cab | sufficient characteristics | 7 |
| prep. | to | dependent characteristics | 5, 7 |
| noun with prep. | station | sufficient characteristics | 7 |
| pattern | transitive verb (SVO) | required characteristics | 1–10 |

A meaning differentiation part 26 selects the meaning of polysemous words based on the characteristics that match the characteristics of the characteristics table 561 determined in the above process and the characteristics of the characteristics record 55. In other words, step 206 determines whether the characteristics of the generated characteristics record 55 has the sufficient characteristics 62 of the characteristics table 561. In this case, owing to the presence of the sufficient characteristics 62 as shown in Table 2, an affirmative determination is made, and processing proceeds to step 208.

The subsequent step 208 determines whether the characteristics record 55 satisfies the required characteristics 64 of the meaning selected by the sufficient characteristics 62. In this case, since the required characteristics is satisfied as shown in Table 2, the process proceeds to step 210. At step 210, the presence of the residual meaning is determined. When the residual meaning is absent, the meaning having the sufficient characteristics 62 and satisfying the required characteristics 64 is selected. The selected meaning is output to the correlative translation processing unit 40 at step 218, thereby terminating the routine.

Consequently the meaning determination part 26 selects the 7th meaning of the characteristics table 561 as the meaning of the word "take." The meaning is output from the output part 28 to the correlative translation processing unit 40. Thus, since the ambiguity of the entered sentence 1 is settled with respect to the meaning, the correlative translation processing unit 40 generates and outputs the translation sentence corresponding to the source sentence as shown in the following translation sentence 1.

Translation sentence 1

Kare wa eki made takushii o tsukatta.

Here, in some entered sentences the characteristics thereof may not match one of the sufficient characteristics 62 and the required characteristics 64. As an example of such a case, entered sentence 2 will be detailed herein below.

Entered sentence 2

He took the building.

The relation of each characteristics of the generated characteristics record 55 and the above characteristics table 561 is shown in Table 3 with respect to entered sentence 2 in the same manner as shown above.

TABLE 3

| Kind of characteristics | Characteristics | Classification of characteristics | Associated meaning |
|---|---|---|---|
| subject | person | dependent characteristics | 1–10 |
| object | building | dependent characteristics | 1, 9 |
| prep. | none | | |
| noun with prep. | none | | |
| pattern | transitive verb (SVO) | required characteristics | 1–10 |

As shown in Table 3, since entered sentence 2 does not contain the sufficient characteristics 62, the meaning of the word take cannot be selected without considering other meanings. Then when the characteristics of entered sentence does not contain the sufficient characteristics 62 (a negative determination is made at step 206), or when the characteristics of the entered sentence constitutes the sufficient characteristics 62, but does not satisfy the required characteristics 64 (a negative affirmation is made at step 208), the process proceeds to step 212 to calculate the similarity between cases having the relation of dependency. In an example of this entered sentence 2, the 4th characteristics (object) having as common characteristics the relation of each characteristics of generated characteristics record 55 and the above characteristics table 561 is selected to specify the case for calculating the similarity. Then the similarity is calculated between the characteristics record 55 of entered sentence 2 and the characteristics record of each case of the 1st and the 9th meaning in the characteristics table 561. The similarity calculation can be determined by calculating an agreement between characteristics records.

At subsequent step 214, the characteristic having the highest frequency is selected as the characteristic of the polysemous word in the entered sentence based on the calculated similarity. Then the process proceeds to step 218. The meaning corresponding to this characteristic is output to the correlative translation processing unit 40 and the routine is terminated.

Consequently, when the meaning of the word "take" is highly similar to the first meaning on the characteristics table 561, the first meaning (occupy) is selected. The correlative translation processing unit 40 generates the corresponding translation as shown in the following translation sentence 2.

Translation sentence 2

Kare wa tatemono o senryoshita.

In addition, in some entered sentences, the characteristics the entered sentence contains have a plurality of meanings corresponding to the sufficient characteristics 62 and the required characteristics 64. But, the meaning of the word "take" cannot be selected. In such a case, the characteristics of the entered sentence satisfies the sufficient characteristics and the required characteristics. When the residual meaning (a negative affirmative determination is made at step 210, the process proceeds to step 216. At step 216, the meaning is elected which matches the largest number of meanings in the above characteristics table.

Furthermore, the frequency of characteristics is added up, and the meaning having the highest frequency may be selected. At subsequent step 218, the selected meaning is output to the correlative translation processing unit 40. This terminates the routine.

As described above, a characteristics table is generated which expresses the relation of each meaning of a polysemous word selected from a plurality of cases to the characteristics corresponding to the meaning. In this characteristics table, the characteristics of each meaning the polysemous word has are classified into sufficient characteristics that does not appear to other meanings, required characteristics entered sentence must satisfy, and dependency characteristics relating to a plurality of meanings.

Consequently when the characteristics corresponding to the sufficient characteristics included in the characteristics table are valid in the process of selecting the meaning of the polysemous word in the entered sentences, the meaning of the polysemous word can be swiftly selected without calculating the similarity, which requires a large amount of calculation from the case base. By calculating the agreement in the required characteristics that must be satisfied by the entered sentences in addition to the sufficient characteristics, the meaning of the polysemous word can be selected with high certainty.

In addition, when the sufficient characteristics and the required characteristics are invalid, the similarity is calculated and the meaning of the polysemous word can be selected by considering cases that are not reflected on the characteristics table. In such a case, when dependent characteristics are present, the similarity between associated meanings is calculated by referring to the dependent characteristics. Thus the amount of calculation decreases and the processing for selecting the meaning of the polysemous word can be effected in a much shorter time.

Thus, in this embodiment information such as semantic information and grammatical information is grasped as an equivalent characteristic. Consequently different kinds of information are used with respect to each meaning of a polysemous word to settle the ambiguity thereof.

In the above embodiment, English is used as the first language for settling the ambiguity, but the present invention is not restricted to English. It may be applied to other languages. In such case even when other languages are used as the first language, a characteristics table can be generated in the same manner as the above embodiment.

Next, French is used as another first language to explain the Embodiment 2 for settling an ambiguity in the French language. Since the construction of the Embodiment is the same as the above Embodiment 1. Detailed description of the same part is omitted and only different parts will be described.

At the outset a characteristics table 56FL (L=1, 2, . . . n, where n represents the number of polysemous words) to utilize for settling the ambiguity of the French language is generated by the characteristics table generation part 30 in the same manner as the above. In other words, the characteristics table generation part 30 affects the characteristics table processing routine shown in FIG. 3 to read case 50$i$ from the case base 34. The read cases are associated with the characteristics field 52$j$ (1≦j≦5) to generate and store the characteristics record 54$i$ (1≦i≦n) comprising a plurality of characteristics stored in the characteristics field of one case (steps 402 and 404). After generating this characteristics record 54$i$ with respect to all the cases 501 to 50$n$ recorded in the case base 34, one word is set that can become an object to which the characteristics table 56FL is generated (steps 406 and 408). In the foregoing passage, an example of setting the word "prendre" will be detailed herein below.

A characteristics table 56F1 divided with the meanings is associated with the word prendre is generated and stored by reading one characteristics record 54$i$ including the set word prendre and registering the characteristics of the characteristics record 54$i$ (steps 410, 412). The word prendre includes the following 10 meanings S.

Meaning S(sens)

1. occuper
2. saiser
3. photographic
4. chosir
5. emmener
6. monter
7. recevir
8. payer
9. manger
10. succes In the next process, after registering the characteristics of all the cases 50$i$ including the word prendre recorded in the case base 34, each of the registered characteristics is classified into the above sufficient characteristics 62, the required characteristics 64, and the dependent characteristics 66 to add the relation of dependency and the frequency of appearance with respect to each of the classified record (step 414 through 418). Furthermore, the following steps are the same, the description thereof is omitted here.

Thus the case base 34 which stored the source sentences in French generates the characteristics table expressing the characteristics corresponding to the meaning by extracting the characteristics of each case with respect to one word. Consequently, the characteristics in the case are extracted as a characteristic for differentiating one meaning from the other.

An example of the characteristics table generated as shown above with respect to the word "prendre" is shown in Table 4.

TABLE 4

| | Characteristics Table for the French Verb "Prendre" | | | | |
|---|---|---|---|---|---|
| sens/trait | 1. subject | 2. object | 3. prep. | 5. nom with prep. | 6. pattern |
| 1. occuper | personne (1-9) *ennemi | *animal *chateau | par en | *surprise *bataille | SVO |

TABLE 4-continued

Characteristics Table for the French Verb "Prendre"

| sens/trait | 1. subject | 2. object | 3. prep. | 5. nom with prep. | 6. pattern |
|---|---|---|---|---|---|
| 2. saiser | *armee personne (1–9) | *arme *main | par | | SVO |
| 3. photographie | personne (1–9) | *photo | a | | SVO |
| 4. chosir | | | | | SVO |
| 5. emmener | personne (1–9) | *personne | a avec | *hospital personne | SVO |
| 6. monter | personne (1–9) | *autobus *voiture | to | *maison | SVO |
| 7. recevir | personne (1–9) | | depuis | personne | SVO |
| 8. payer | personne (1–9) | *plat | | | SVO |
| 9. manger | personne (1–9) | *cafe *medicicament *air | de avec | | SVO |
| 10. succes | *film | | | | *SV |

The characteristics table generated as shown above is used to perform the processing for settling the ambiguity of a polysemous word in French in accordance with the flowchart shown in FIG. 4 in the same manner as the above embodiment.

Subsequently Embodiment 3 for settling the ambiguity of the meaning of the Japanese word by using Japanese as another example of the first language will be described. The construction of the Embodiment is approximately the same as the above Embodiment. Detailed description of similar parts is omitted and only differing parts will be detailed.

The characteristics table generation part 30 in the polysemous word settling unit 20 outlined in the above embodiment generates the characteristics table 56JM (M =1, 2, ... . n, n represents the number of polysemous words) used for settling the meaning of polysemous word in Japanese. The characteristics table 56JM includes the following 10 |meaning/characteristic| in an example of the word "toru."

Meaning/characteristic
1. senryosuru
2. tsukamu
3. satsueisuru
4. erabu
5. saiyosure
6. noru
7. uketoru
8. kane o harau
9. inshokusuru
10. maneku An example of the characteristics table 56J1 thus generated with respect to the word "toru" is shown in the following Table 5.

TABLE 5

Characteristics Table for the Japanese Verb "Toru"

| meaning/characteristics | 1. subject | 2. object | 3. joshi | 5. noun with joshi | 6. pattern |
|---|---|---|---|---|---|
| 1. senryosuru toraeru | hito (1–9) *teki *guntai | *dobutsu *shiro | ni de | *totsuzen *tatakai | SVO |
| 2. tsukamu | hito (1–9) | *ude *te | de | | SVO |
| 3. satsueisuru | hito (1–9) | *shashin | de | | SVO |
| 4. erabu | | | | | SVO |
| 5. saiyosuru | | | | | SVO |
| 6. noru | hito (1–9) | *basu *kuruma | he | *ie | SVO |
| 7. uketoru | hito (1–9) | | kara | *hito | SVO |
| 8. kane o harau | hito (1–9) | *ie | | | SVO |
| 9. inshokusuru | hito (1–9) | *kohi *kusuri | wo | | SVO |
| 10. maneku | | *shisho | wo | | SVO |

The characteristics table generated as shown above is used to perform the processing for settling the ambiguity of polysemous words in Japanese in accordance with the flowchart shown in FIG. 4 in the same manner as the above embodiment.

As described above, the method for machine translation according to the present invention uses information which is semantic information and grammatical information in which a plurality of source sentences in the first language have to enable selection of the meaning of a polysemous word from the sufficient characteristics and the information of the source sentences to be translated. Thus the present invention has an advantage of swiftly selecting the meaning of a polysemous word by settling the ambiguity of the polysemous word.

In addition, when the analyzed sentences have information corresponding to sufficient characteristics, the meaning has the required characteristics of information associated with all the sentences. Thus, the present invention has an advantage of selecting the meaning of the polysemous word with high accuracy by settling the ambiguity thereof.

Even when the sufficient characteristics and the required characteristics are invalid, the meaning of the polysemous word can be selected through calculation of the similarity by using cases in the first language. Thus the present invention as the advantage of selecting the meaning of a polysemous word that can be associated with the essential meaning thereof.

The method for machine translation according to the present invention provides a characteristics table expressing the relation of information and the meaning corresponding to said information by using information which is semantic information and information on sentence patterns possessed by plurality of source sentences in the first language. Thus the present invention has the advantage of settling the ambiguity of a polysemous word with an extremely small number of rules without calculating the similarity with respect to all the sentences and cases.

I claim:

1. A method for machine translation wherein structures of source sentences in a first language which contain polysemous words having a plurality of meanings are analyzed to translate the source sentences into target sentences in a second language; said method for a given polysemous word comprising the steps of:

a. preliminarily obtaining sufficient characteristics of the structure of a plurality of source sentences containing said given polysemous word to enable distinguishing a plurality of meanings of said given polysemous word, each meaning from the other meanings of the plurality of meanings, said sufficient characteristics being information which is at least one of either the semantic information or grammatical information from said plurality of sentences each of which contains said given polysemous word used so that said given polysemous words meaning is unambiguous;

b. comparing characteristics of said plurality of source sentences with the same characteristics of another source sentence which is to be translated into a target sentence;

c. selecting for the meaning of said given polysemous word in said another sentence one meaning that matches sufficient characteristics to distinguish that one meaning from all the other plurality of meanings; and d. using the one meaning selected in step c) in translating said another source sentence to a target sentence.

2. The method of claim 1 including:

e) eliminating from consideration meanings of said polysemous words which have no matching dependent characteristics with said another sentence when there are not sufficient characteristics to select a meaning in step c);

f) comparing characteristics of source sentences of said plurality having dependent characteristics with said another sentence; and g) selecting for said polysemous word in said another sentence the meaning with the most matching characteristics.

3. The method of claim 1 including comparing said another sentence to other source sentences using said polysemous word when a characteristic in all sentences of said one meaning of said plurality of sentences does not occur in said another sentence.

4. A machine translation apparatus in which the structures of source sentences in a first language which contain polysemous words having a plurality of meanings are analyzed to translate the source sentences into target sentences in a second language; said apparatus comprising:

a) a characteristic table expressing sufficient characteristics of the structures of a plurality of source sentences each using a given polysemous word so that its meaning is unambiguous in that sentence to enable distinguishing the plurality of meanings of said polysemous word, each meaning from the other of said plurality of meanings, said sufficient characteristics being information which is at least one of either the semantic information or grammatical information distinguishing each meaning of the plural meanings of said given polysemous word from the other of said plurality of meanings;

b) a determination means for determining whether at least one of either said semantic information or grammatical information in another source sentence to be translated matches characteristics in said characteristics table;

c) a selection means for selecting one meaning of said given polysemous word when sufficient characteristics of said another source sentence to be analyzed match a meaning to distinguish that one meaning from all the other plurality of meanings of said polysemous word; and d) means for translating said given source sentence into a target sentence using the meaning selected in paragraph c).

* * * * *